United States Patent
Macie et al.

(10) Patent No.: US 10,814,981 B2
(45) Date of Patent: Oct. 27, 2020

(54) RAM AIR INLETS HAVING RADAR ABSORBING MATERIAL

(71) Applicant: Goodrich Corporation, Charlotte, NC (US)

(72) Inventors: Audra Macie, Marlborough, MA (US); Mark Long Whittum, Newton, MA (US)

(73) Assignee: Goodrich Corporation, Charlotte, NC (US)

( * ) Notice: Subject to any disclaimer, the term of this patent is extended or adjusted under 35 U.S.C. 154(b) by 325 days.

(21) Appl. No.: 15/920,119

(22) Filed: Mar. 13, 2018

(65) Prior Publication Data

US 2019/0283877 A1 Sep. 19, 2019

(51) Int. Cl.

| | |
|---|---|
| *B64D 7/00* | (2006.01) |
| *B64C 1/36* | (2006.01) |
| *B64D 33/02* | (2006.01) |
| *B64D 7/08* | (2006.01) |
| *G03B 15/00* | (2006.01) |

(52) U.S. Cl.
CPC .................. *B64D 7/00* (2013.01); *B64C 1/36* (2013.01); *B64D 7/08* (2013.01); *B64D 33/02* (2013.01); *G03B 15/006* (2013.01)

(58) Field of Classification Search
CPC ..................................... B64D 7/00; B64C 1/36
See application file for complete search history.

(56) References Cited

U.S. PATENT DOCUMENTS

| | | | | |
|---|---|---|---|---|
| 4,275,857 A | * | 6/1981 | Bergsten | B64D 33/02 137/15.1 |
| 4,593,288 A | * | 6/1986 | Fitzpatrick | B64C 1/36 244/118.1 |
| 6,662,546 B1 | | 12/2003 | Giffin, III | |
| 2003/0052829 A1 | | 3/2003 | Desargant et al. | |
| 2014/0070056 A1 | * | 3/2014 | Merlo | B64D 7/00 244/199.1 |
| 2014/0360206 A1 | * | 12/2014 | Bradbrook | B64D 27/24 60/797 |
| 2015/0314883 A1 | * | 11/2015 | Judas | B64D 33/02 244/53 B |
| 2016/0229536 A1 | | 8/2016 | Aull et al. | |

OTHER PUBLICATIONS

Halsema Jongh van Es Otten Vermeulen liempt: "Realization of a Scalable Airborne Radar", 38th European Microwave Conference Oct. 31, 2008 (Oct. 31, 2008), pp. 1640-1643.
Extended European Search Report Issued in corresponding EP application No. 19162636.5, dated Jun. 7, 2019.

* cited by examiner

*Primary Examiner* — Philip J Bonzell
*Assistant Examiner* — Tye William Abell
(74) *Attorney, Agent, or Firm* — Locke Lord LLP; Daniel J. Fiorello; Scott D. Wofsy

(57) ABSTRACT

An aircraft pod can include a pod shell defining a window, a radar system disposed within the shell and in optical communication with the window in the shell, and configured to send and/or receive radar signals away from the pod shell in a radar field of regard, and a ram air inlet structure disposed on an outer surface of the shell in optical communication with the radar field of regard, wherein the ram air inlet structure is made of or coated with a radar absorbing material.

8 Claims, 1 Drawing Sheet

RAM AIR INLETS HAVING RADAR ABSORBING MATERIAL

BACKGROUND

1. Field

The present disclosure relates to aircraft systems, more specifically to ram air inlets (e.g., for aircraft pods).

2. Description of Related Art

The ram air inlets are traditionally made from metal which may reflect the electromagnetic energy transmitted by the radar (e.g., X-band) due to the positioning of the radar unit/window, e.g., on an aircraft pod. Reflection can degrade the ability of the radar system.

Such conventional methods and systems have generally been considered satisfactory for their intended purpose. However, there is still a need in the art for improved ram air inlets. The present disclosure provides a solution for this need.

SUMMARY

In accordance with at least one aspect of this disclosure, a ram air inlet structure for an aircraft pod can include a body made of or coated with radar absorbing material. The inlet structure can include a scoop shape, for example, or any other suitable shape.

In accordance with at least one aspect of this disclosure, an aircraft pod can include a pod shell defining a window, a radar system disposed within the shell and in optical communication with the window in the shell, and configured to send and/or receive radar signals away from the pod shell in a radar field of regard, and a ram air inlet structure disposed on an outer surface of the shell in optical communication with the radar field of regard, wherein the ram air inlet structure is made of or coated with a radar absorbing material.

The ram air inlet structure includes a scoop shape, for example, or any other suitable shape. The ram air inlet structure can be disposed on a flange of the pod shell facing the window such that the ram air inlet structure extends toward and/or into the radar field of regard or an edge thereof. In certain embodiments, the ram air inlet structure can be bolted to the flange of the pod shell.

In accordance with at least one aspect of this disclosure, a method can include forming a ram air inlet structure from radar absorbing material and configured to be disposed on an outer surface of a pod shell. Forming can include forming the ram air inlet structure to include a scoop shape.

The method can further include disposing the ram air inlet on a flange of the pod shell facing the window such that the ram air inlet structure extends toward and/or into the radar field of regard or an edge thereof. Disposing the ram air inlet structure includes bolting the ram air inlet structure to the flange of the pod shell.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
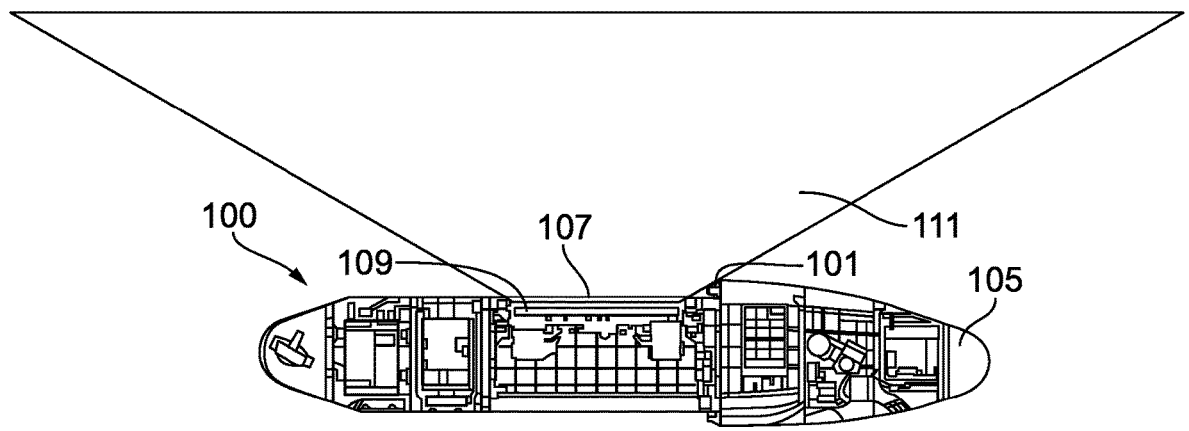
FIG. 1 is a schematic cross-sectional view of an embodiment of a pod in accordance with this disclosure.
Figure 2:
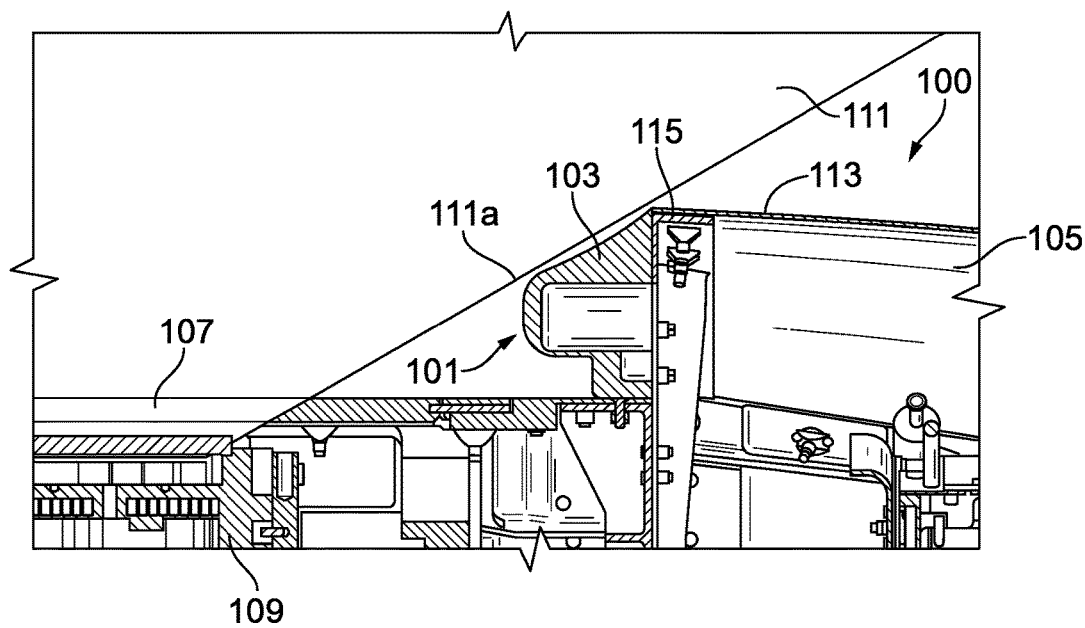
FIG. 2 is a zoomed view of the ram air inlet structure attached to the pod shell.

Reference will now be made to the drawings wherein like reference numerals identify similar structural features or aspects of the subject disclosure. For purposes of explanation and illustration, and not limitation, an illustrative view of an embodiment of a pod in accordance with the disclosure is shown in FIG. 1 and is designated generally by reference character 100. Other embodiments and/or aspects of this disclosure are shown in FIG. 2. The systems and methods described herein can be used to improve radar quality, e.g., in an aircraft system.

Referring to FIGS. 1 and 2, a ram air inlet structure 101 for an aircraft pod 100 can include a body 103 made of or coated with radar absorbing material. One or more embodiments of radar absorbing material are sold by Arc Technologies, Inc., of 37 S Hunt Road, Amesbury, Mass., 01913. Any other suitable radar absorbing material (e.g., non-magnetic material) is contemplated herein.

The inlet structure 101 can include a scoop shape as shown, for example. Any other suitable shape is contemplated herein.

In accordance with at least one aspect of this disclosure, an aircraft pod 100 can include a pod shell 105 defining a window 107. The pod shell 105 can be made of any suitable material (e.g., aluminum). The pod 100 can include a radar system 109 disposed within the shell 105 and in optical communication with the window 107 in the shell 105. The radar system 109 is configured to send and/or receive radar signals away from the pod shell 105 in a radar field of regard 111 (e.g., in a conical shape as depicted).

A ram air inlet structure 101 as described above is disposed on an outer surface 113 of the shell 105 in optical communication with the radar field of regard 111 (e.g., unintentionally). As mentioned above, the ram air inlet structure 101 is made of or coated with a radar absorbing material and can include a scoop shape, for example.

As shown, the ram air inlet structure 101 can be disposed on a flange 115 of the pod shell 105 facing the window 107 such that the ram air inlet structure 101 extends toward and/or into the radar field of regard 111 or an edge 111a thereof. In certain embodiments, the ram air inlet structure 101 can be bolted to the flange 115 of the pod shell 105, or attached in any other suitable way (e.g., welding). In certain embodiments, the ram air inlet structure 101 can be in fluid communication with an environmental control system (ECS) condenser.

In accordance with at least one aspect of this disclosure, a method can include forming a ram air inlet structure from radar absorbing material and configured to be disposed on an outer surface of a pod shell. Forming can include forming the ram air inlet structure to include a scoop shape.

The method can further include disposing the ram air inlet on a flange of the pod shell facing the window such that the ram air inlet structure extends toward and/or into the radar field of regard or an edge thereof. Disposing the ram air inlet structure includes bolting the ram air inlet structure to the flange of the pod shell.

As shown, the edge 111a of radar field of regard 111 does not include the beam width. This means that the field of regard edge 111a will be closer to the ram air inlet structure 101 than depicted. It is possible that the radar beam will hit the ram air inlet structure 101. The can cause large returns from the ram air inlet structure 101 and thus can degrade radar performance. By making the ram air inlet out of radar absorbing material, or coating the ram air inlet with radar absorbing material, returns will be eliminated or minimized and thus cause limited to no impact on radar performance. Embodiments can be utilized on and/or include a DB110 pod, e.g., which can be mounted below aircraft on center line for example.

Any suitable combination(s) of any disclosed embodiments and/or any suitable portion(s) thereof is contemplated therein as appreciated by those having ordinary skill in the art.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. An aircraft pod, comprising:
   a pod shell defining a window;
   a radar system disposed within the shell and in optical communication with the window in the shell, and configured to send and/or receive radar signals away from the pod shell in a radar field of regard; and
   a ram air inlet structure disposed on an outer surface of the shell in optical communication with the radar field of regard, wherein the ram air inlet structure is made of or coated with a radar absorbing material.

2. The pod of claim 1, wherein the ram air inlet structure includes a scoop shape.

3. The pod of claim 1, wherein the ram air inlet structure is disposed on a flange of the pod shell facing the window such that the ram air inlet structure extends toward and/or into the radar field of regard or an edge thereof.

4. The pod of claim 3, wherein the ram air inlet structure is bolted to the flange of the pod shell.

5. A method, comprising:
   forming a ram air inlet structure from radar absorbing material and configured to be disposed on an outer surface of a pod shell facing a window such that the ram air inlet structure extends into the radar field of regard.

6. The method of claim 5, wherein forming includes forming the ram air inlet structure to include a scoop shape.

7. The method of claim 6, further comprising disposing the ram air inlet on a flange of the pod shell.

8. The method of claim 7, wherein disposing the ram air inlet structure includes bolting the ram air inlet structure to the flange of the pod shell.

* * * * *